No. 793,076. PATENTED JUNE 27, 1905.
H. C. HUBBELL.
ANODE PLATE FOR BATTERIES.
APPLICATION FILED OCT. 3, 1904.

WITNESSES:
J. L. Mockabee
May M. Plyer

INVENTOR
Harry C. Hubbell
BY Jas. L. Skidmore
His Attorney.

No. 793,076. Patented June 27, 1905.

UNITED STATES PATENT OFFICE.

HARRY C. HUBBELL, OF JERSEY CITY, NEW JERSEY.

ANODE-PLATE FOR BATTERIES.

SPECIFICATION forming part of Letters Patent No. 793,076, dated June 27, 1905.

Application filed October 3, 1904. Serial No. 227,065.

*To all whom it may concern:*

Be it known that I, HARRY C. HUBBELL, a citizen of the United States, residing at Jersey City, in the county of Hudson and State of New Jersey, have invented new and useful Improvements in Anode-Plates for Batteries, of which the following is a specification.

This invention relates to anode-plates for use in that type of reversible galvanic batteries employing an electrolyte of potassium hydrate or sodium hydrate and a zincate.

One of the objects of my invention is to provide a battery-plate of simple construction and inexpensive manufacture which will provide an extended surface for the deposit of zinc within a comparatively small and compact structure.

Another object is to provide a skeleton plate or grid which may be quickly and cheaply made and which will afford a large surface area for the zinc deposit and be permanent, strong, and efficient for its purpose.

These and other objects are attained by means of the construction illustrated in the accompanying drawings, in which—

Figure 1:
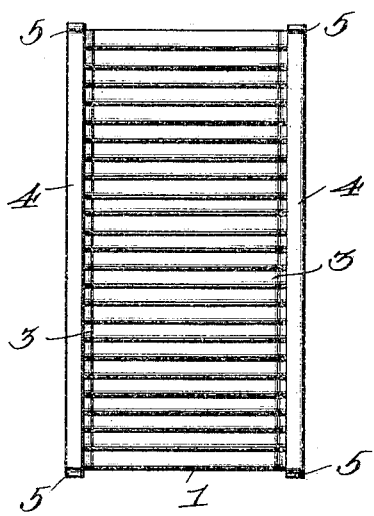
Figure 2:
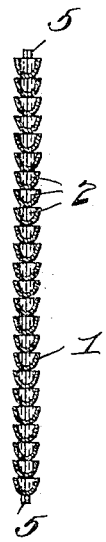
Figure 3:
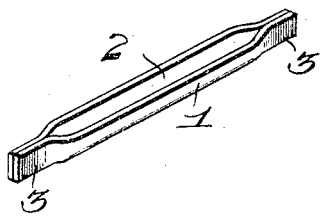
Figure 4:
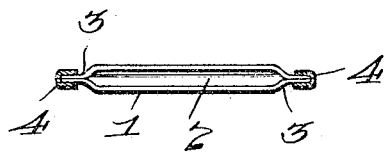

Figure 1 is a side elevation of a battery-plate made in accordance with my present invention. Fig. 2 is a central vertical section of the same. Fig. 3 is a perspective view of one of the gutters or troughs utilized in making up my plate. Fig. 4 is a transvere section of the plate.

Referring to the drawings for a more particular description of my invention, the numeral 1 designates the transversely-disposed troughs or zinc-holders, formed of soft sheet-steel. In the manufacture of these troughs long strips of soft sheet-steel are bent longitudinally to form U-shaped grooves 2 in the strips, and the long strips are then cut into the required lengths and pressed or pinched together at the ends, as at 3, to close the ends of the grooves. At the opposite sides of the plate and firmly connected to the ends of the troughs are the channel-plates or keepers 4. These plates or keepers are made of the same material as the troughs, preferably soft steel, and they are bent down firmly upon the ends of the troughs and crimped or indented at the corners of the plate, as at 5. The plates 4 serve to stop the ends of the grooves 2 and at the same time to hold the troughs at the required distances apart to permit the zinc to deposit in each trough within a comparatively small area for the entire plate.

The parts of the anode may be quickly and cheaply assembled by means of a simple mechanical device, and the anode when completed is durable and efficient for its purpose and will contain a large quantity of zinc deposited within a small area.

Having thus fully described my invention, what I desire to secure by Letters Patent and claim is—

1. A battery-plate consisting of a series of transverse troughs formed of strips of metal and having their ends pinched together, and vertical U-shaped channel-plates firmly connected to the ends of the troughs, the said channel-plates being crimped at their ends to hold the troughs in place, substantially as described.

2. The anode-plate herein described, consisting of strips of metal bent to form U-shaped zinc holders or troughs, the ends of said troughs being pressed together to close said ends, and said troughs being spaced apart and held in place by channel-plates inclosing the ends of said troughs and crimped and indented, substantially as described.

HARRY C. HUBBELL.

In presence of—
 DUNCAN T. MCLAREN,
 I. BAUM.